April 13, 1965 A. F. HOHMANN 3,178,175

SEQUENTIAL CARD READER

Filed June 23, 1960 4 Sheets-Sheet 1

FIG. I

INVENTOR.
ALBERT F. HOHMANN
BY James H. Conner
AGENT.

April 13, 1965 A. F. HOHMANN 3,178,175

SEQUENTIAL CARD READER

Filed June 23, 1960 4 Sheets-Sheet 2

INVENTOR.
ALBERT F. HOHMANN

BY James M. Conner

AGENT.

INVENTOR.
ALBERT F. HOHMANN
BY
James H. Conner
AGENT.

INVENTOR.
ALBERT F. HOHMANN
BY
James H. Corner
AGENT.

United States Patent Office 3,178,175
Patented Apr. 13, 1965

3,178,175
SEQUENTIAL CARD READER

Albert F. Hohmann, Teaneck, N.J., assignor, by mesne assignments, to American Electronics, Inc., a corporation of California Filed June 23, 1960, Ser. No. 38,162
18 Claims. (Cl. 271—52)

The present invention relates generally to data processing and is more particularly concerned with sequentive input of data from card entries for entry upon a master output of integrated data.

In the modern techniques of automatic business machines it is usually necessary to convert the initial data from its written or typed form into punched cards or onto magnetic tape before such data can be presented to the automatic machine for the processing desired which is a time consuming and expensive pre-computer operation. Furthermore, in such automatic systems, the various prepared cards are taken in stacks to the computers whereafter an experienced operator can arrange for the desired order of data from the cards by manipulation of the stacks.

The present invention is an improvement in such data processing systems as these whereby pre-computer operations are minimized or entirely eliminated and where data may be fed to the machine in incremental form and in intermittent manner without the need for stacking the cards and without skilled operation being required.

Specifically, the present invention provides an integral unit in the form of a card sequential reader which can take individual punched cards of any type, read the data thereon, feed this data to any external source, and then return the card. This can be done in any sequence of cards and at any time interval between cards and without the use of any special operational skill being required. Thus, as an example, in payroll computing, a workman may take a punch card already pre-punched with his identification and the particular job number, place it in a conventional automatic time punching machine which thus indicates his hours of work on that date, then insert this punched card in the sequential card reader of the present invention, press the operating key and pick up the read card in a few seconds. The data on the card will now have been recorded on any suitable memory device or read-out device for any purpose. For example, the data from such time-charge card can be entered on a punched tape recorder with or without other appropriate data pertaining thereto.

The sequential card reading device of the present invention is an integral and separate unit which can be readily combined with other units for data processing to provide an integrated data processing system.

Generally, in practicing this invention there is provided a frame which has a card receiving platen. When a card is placed on the platen it is gripped and drawn forward between driven feed rollers to a position where the card is stopped in register for reading. A switch is then actuated to indicate "card in." With the card in this position, means are provided to sequentially lower sensing fingers or brushes into operative position on the card, to move the card column by column below the brushes for data analysis and collection, to positively drive the card in incremental steps for such reading, to stop the card, raise brushes and forward driving rollers out of the way and thereafter return the read card to original position, the whole cycle taking but few seconds, such as 2 to 5 seconds for feeding, reading and return.

The apparatus can readily be used with all forms of conventional remote controls, remote memories or recorders and the like, being an integral unit capable of being integrated with other equipment. It utilizes microswitches for close control of movements and accurate register of parts, solenoids for sequential actuation of the feeding, reading and return units, and is compact, simple, foolproof requiring no experienced operator time. It can run continuously even when used for intermittent work.

A typical operational cycle for the unit of the present invention is as follows:

Assuming the machine to be running idle, as indicated above and the person wishes to enter data into the machine.

A suitably punched card which is to be read by the operator is laid upon the platen of the machine and is manually pushed forward until it is engaged by constantly running friction feeding wheels which then pass the card to a stop, thereby causing a microswitch or "card in" switch to be closed. This initiates a signal which remotely indicates that the card is in position to be scanned and read. Thereupon, the brush solenoid which controls position of the sensing fingers is actuated to place the brushes in a lowered position in contact with the face of the card. Simultaneously, the driving rollers are placed on the edge for friction drive of the card. Thereafter, a pawl engaging solenoid is actuated to place a pawl in operating position relative to the teeth of an indexing wheel which can incrementally rotate. Since the index cam is constantly running, this will cause the pawl to be reciprocated and step by step this will rotate the indexing wheel in increments determined by the spacing of the teeth, thereby giving an equivalent increment of drive to the edge friction driving wheels to progressively ride the card in proportional increments of longitudinal movement beneath the brushes. Since the increments of movement of the card are selected to correspond with the spacing of the punched holes in the card, this will mean column by column reading by the brushes over the card. The information gleaned by such incremental or step-wise movement of the card will be transmitted by conventional circuitry from the brushes to a suitable memory or storage member or recorder.

Rotating with the indexing wheel is a control cam plate having a single cam declivity so orientated that when the indexing wheel has finished its cycle, namely, when the desired number of columns have been scanned, the cam declivity will be in position to operate an end-cycle microswitch, which then signals to the remote point that the card has been fully read. This causes the card return solenoid to operate to raise a holding ratchet from the indexing wheel and since the indexing pawl solenoid is inactive, this will permit the indexing wheel to be reversed in direction under urge of the spring-return device which has been wound up by the forward step-by-step movement of the indexing wheel. This will cause the edge driving wheels to reverse also and drive the card back to its starting position, the brush solenoid being inactive so that the brushes are out of the way of such return movement. A positive stop on the indexing wheel brings this to a halt in such reverse direction when the card has been returned to its original position. Since the spring-return device is under braked control of the constantly moving shaft which the spring surrounds, the back movement or return will be at a predetermined rate of velocity to permit a correct return of the card without injury thereto and without a sudden surge of energy applied thereto.

It will be recognized that the external control of the device is conventional and simply comprises a stepwise sequence switch duly timed to the desired cycle, as determined by the type of card being read and the type of information required from the card.

To permit synchronizing of such external timing and control devices, the main shaft which is also driven from the common prime mover at constant speed may have a plurality of cam operated microswitches. Thus, one of these may operate a punched tape recorder in synchronism with the card reader according to the invention. Another of said switches may control the operation of a stepped sequence switch which operates the various solenoids of the card reader in the sequence required, as given above, with suitable time intervals therebetween. The third illustrated microswitch may operate to select the information which comes from the brushes and place this in an orderly fashion in suitable form for applying it intelligently to the punched tape. More of such cam operated microswitches may be provided as needed and alternatively, these can be dispensed with entirely.

The prime mover may be a common source with other modular units or it can be individual for the card reader unit according to the present invention.

The general form of apparatus above discussed may be of several forms and modifications. A separate solenoid may be used for raising the sensing fingers or brushes and for the edge drive rollers or a single solenoid may be used for both actions. In the latter case, the forward friction drive and the brushes may be lifted together since this is only needed when the card is returned. The solenoids used in the present invention may be energized for active operation and left de-energized when their controlled parts are not in operative position which is preferred although the reverse position can be utilized also. In like manner, the microswitches used can be positively opened or positively closed depending on the required circuitry control.

Reference will now be made to the accompanying drawings which illustrate one mode of carrying out the present invention and in which.

Reference will now be made to the drawings, which illustrate an embodiment of the present invention and its mode of operation.

Figure 1:
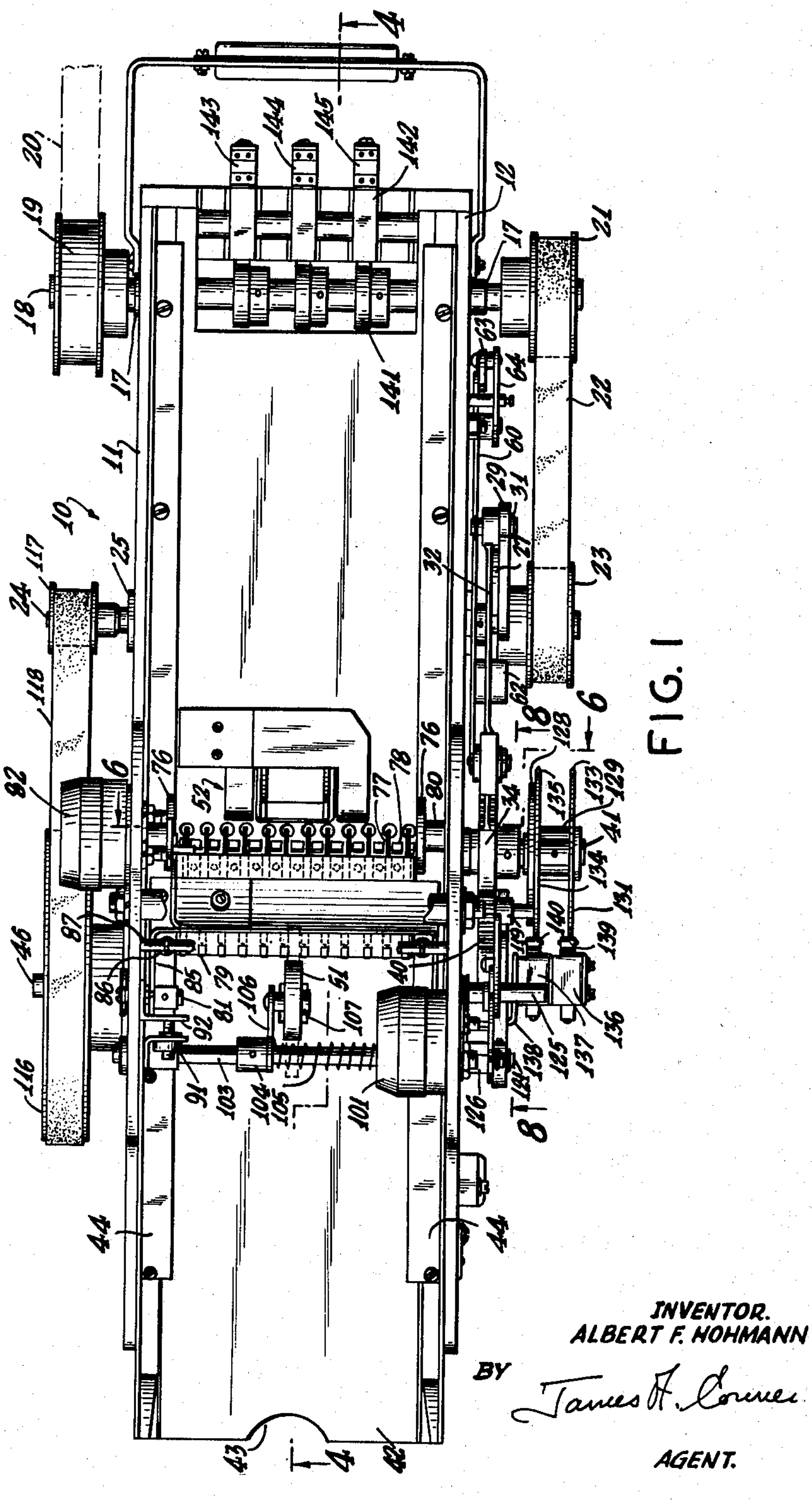
FIGURE 1 is a plan view of the sequential card reader of the present invention.
Figure 2:
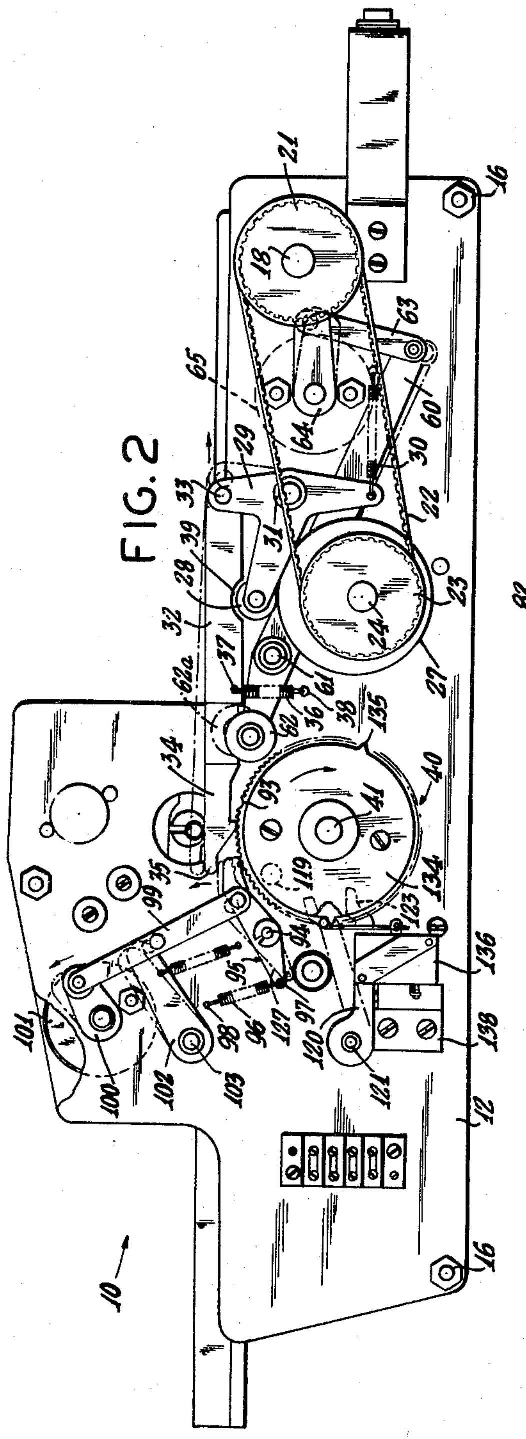
FIGURES 2 and 3 are side elevational views of the sequential card reader of FIG. 1.
Figure 3:
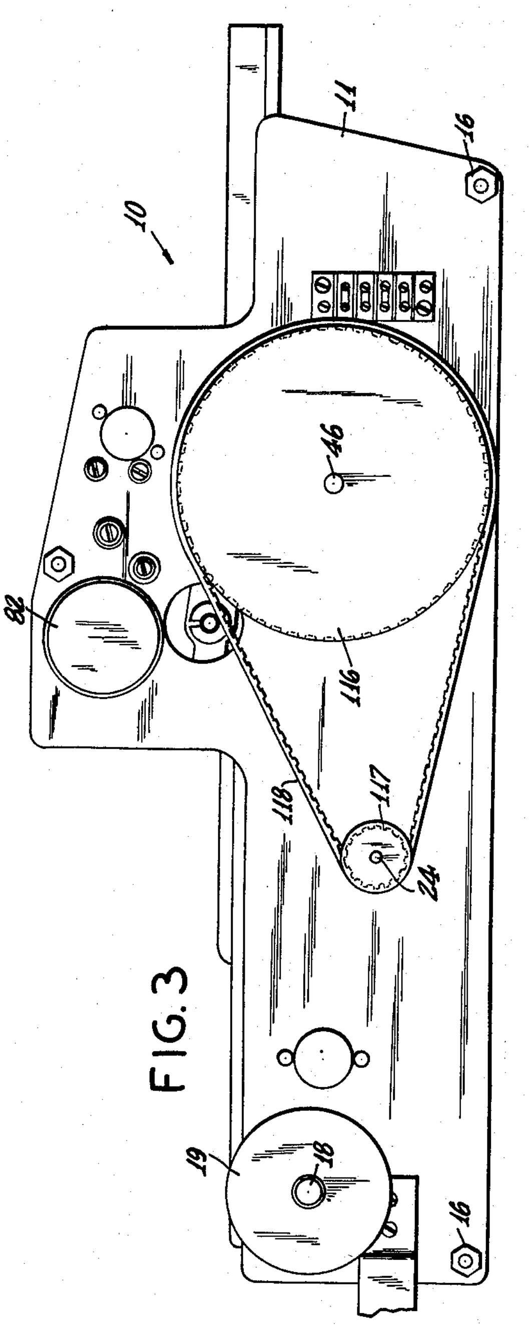
Figure 4:
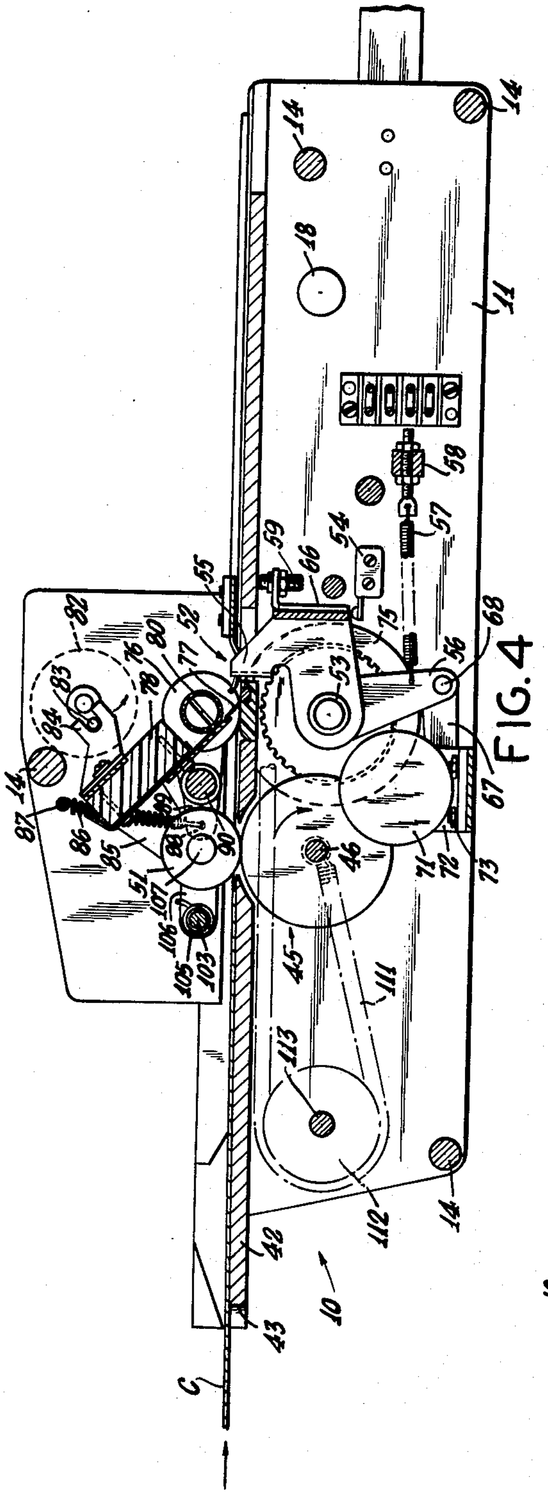
FIGURE 4 is a cross-sectional elevation through the sequential card reader of the present invention taken on line 4—4 of FIG. 1.
Figure 5:
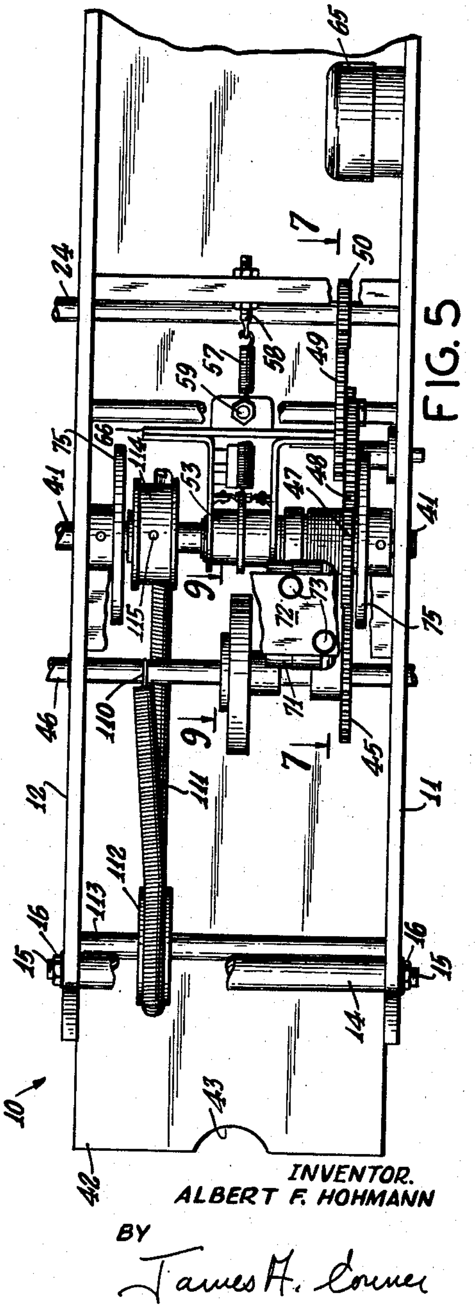
FIGURE 5 is an underside plan of FIG. 1, cut-away to show the operation of the certain parts of the apparatus more clearly.

In FIGS. 1, 2 and 3, which represent a plan view and an elevation from each side, respectively, the sequential card reader according to the present invention is shown as an integral unit mounted with all necessary parts on a rigid unitary frame 10 comprised of two side members 11 and 12 which are held in spaced relation by suitable cross-bars, one of which is better shown in FIG. 5 as a spacer 14 having reduced screw-threaded ends 15 which pass through apertures in the side members 11 and 12 and nuts 16, these spacers 14 being shown in cross section in FIG. 4. As many spacers 14 as are needed for a rigid unitary structure for frame 10 are provided. Alternatively, the unit 10 may be welded into a rigid frame.

Mounted to rotate in suitable anti-friction bearings 17 is a main drive shaft 18, this being arranged at the rear end of unit 10, i.e. the end opposite to that to which the card to be read will be fed, as hereinafter explained. Shaft 18 is adapted to be rotated by a pulley 19 (FIG. 1) fixed thereon which may be suitably rotated by a belt 20, shown in phantom in FIG. 1. As hereinafter described, main drive shaft 18 is adapted to be constantly rotated in one direction only and comprises the means for causing operation of all the operating parts of the unit. It will be driven at a constant speed by any conventional speed control means. Alternatively, the shaft 18 may be driven by its own prime mover, such as an electric motor which then can be mounted on the frame of unit 10.

Fixed to the other end of main drive shaft 18 is a pulley 21, having a driving belt thereon 22 which in turn drivingly connects with a pulley 23 mounted for rotation on a shaft 24 protruding beyond and conventionally supported in side frame members 11 and 12 by anti-friction bearings shown only with respect to side member 11 at 25 (FIG. 1). At the other end, projecting beyond side member 11, the shaft 24 fixedly carries a small diameter belt driving pinion 26, the function of which will be later described.

Also mounted to move with shaft 24 as best shown in FIG. 2, is a continuous faced cam 27 which is the card indexing cam and this is so shaped that the roller cam follower 28, continuously in surface contact with cam 27 rides up and down with a floating vertical motion by virtue of the T-shaped support 29 on arm of which is spring-urged by spring 30 to cause a constant frictional contact between cam 27 and follower 28. Support 29 is mounted for reciprocating action on an anti-friction bearing 31.

Mounted for free movement at the other arm of the T-shaped member 29, is an elongated bar 32 connected thereto by a non-friction support pin 33, as shown. Bar 32 terminates at its other end in a pawl 34 having a tapered end point 35. Intermediate its ends, bar 32 has a spring 36 fastened thereto at 37 and fastened at its other end to the frame 12, at 38. Also, at an area where cam follower 28 is proximate to the underside of arm 32, there is a curved cut-out 39 shaped to the curved contour of the roller which forms cam follower 28.

Thus, it will be seen that, with main shaft 18 running, cam 27 will be rotating in its one direction and cam follower 28 will ride up and down thereon moving arm 32 from its full line position in FIG. 2 to the dotted position marked 32*a*, whereby pawl 34 will partake of an elliptical path, with the longer diameter in a horizontal plane. To take advantage of this movement, there is provided a ratchet wheel 40 mounted on a shaft 41 which is carried by side members 11 and 12 in suitable anti-friction bearings (not shown). Ratchet wheel 40 has compound teeth pitched away from pawl 34 (FIG. 8) so that, as pawl 34 moves in its elliptical path, it engages and advances the ratchet wheel 40 one tooth. Its arrangement will be further described in connection with the card reading and advance to be provided.

Since it is necessary to disconnect the pawl 34 from the ratchet 40 to prevent operation of the latter, means are provided to raise pawl 34 out of contact with ratchet 40 while still permitting shaft 24 to run as is necessary. To this end, lever 60 pivoted at 61 has an operating roller 62 at one end engageable with the underside of arm 32 near the pawl 34 and at its other end it is linked by lever 63 to the operating arm 64 of a torque solenoid 65. When solenoid 65 is deenergized, the linkage 60, 63, 64 moves to the dotted position in FIG. 2 and the roller 62 assumes position 62*a*, thus raising arm 32 out of position to have pawl 34 in operative contact with ratchet wheel 40, namely, arm 32 will be held in the dotted position 32*a* of FIG. 2. The arm 32 will now idle since the cam 27 will continue to turn but cam follower can no longer influence arm 32. This condition will continue while solenoid 65 is maintained energized.

It is the purpose of the ratchet wheel 40 to carry a suitable punched card to be read, step by step through the unit by a series of pick-up brushes, using the movement of pawl 34 for this function. Accordingly, reference will now be made to the card feeding function and parts.

In FIGS. 1 to 4, there is shown a card support platen 42 having a cut-out 43 to assist insertion and removal of a card to be read into the channel guide formed by plates 44. In FIG. 4, a card C is shown in section inserted in such guide. The card C will be a conventional punched card having stamped out holes in its body or slots in its edges connoting data to be read. The unit of the present invention can be readily adapted to any form of punched card conventionally used for data processing. As will be better explained hereinafter, the size, shape, number of teeth and arrangement of ratchet wheel 40 will be selected to suit the type of cards being read. Card C is pushed along platen 42 by hand until it is gripped between two driven friction rollers which are always operating when the machine is in operation. The lower roller 45 is mounted to rotate with a shaft 46 (FIG. 4), which shaft is driven from driving shaft 24 carrying cam 27 by means of a chain of gears 47 to 50 best shown in FIG. 7 whereby the single roller 45 is given a positive drive at all times in one direction. The shafts bearing gears 47–50 have not been identified since any suitable chain drive from shaft 24 to shaft 46 of conventional form will be satisfactory. Roller 45 operates so that its periphery is just about level with the upper face of platen 42 and it works within a slot in said platen whereby an upper friction roller 51 can make direct contact therewith.

Roller 51 is suitably mounted in an anti-friction bearing and can be moved toward and away from its mating roller 45 as later explained.

Figures 7, 8, 9:
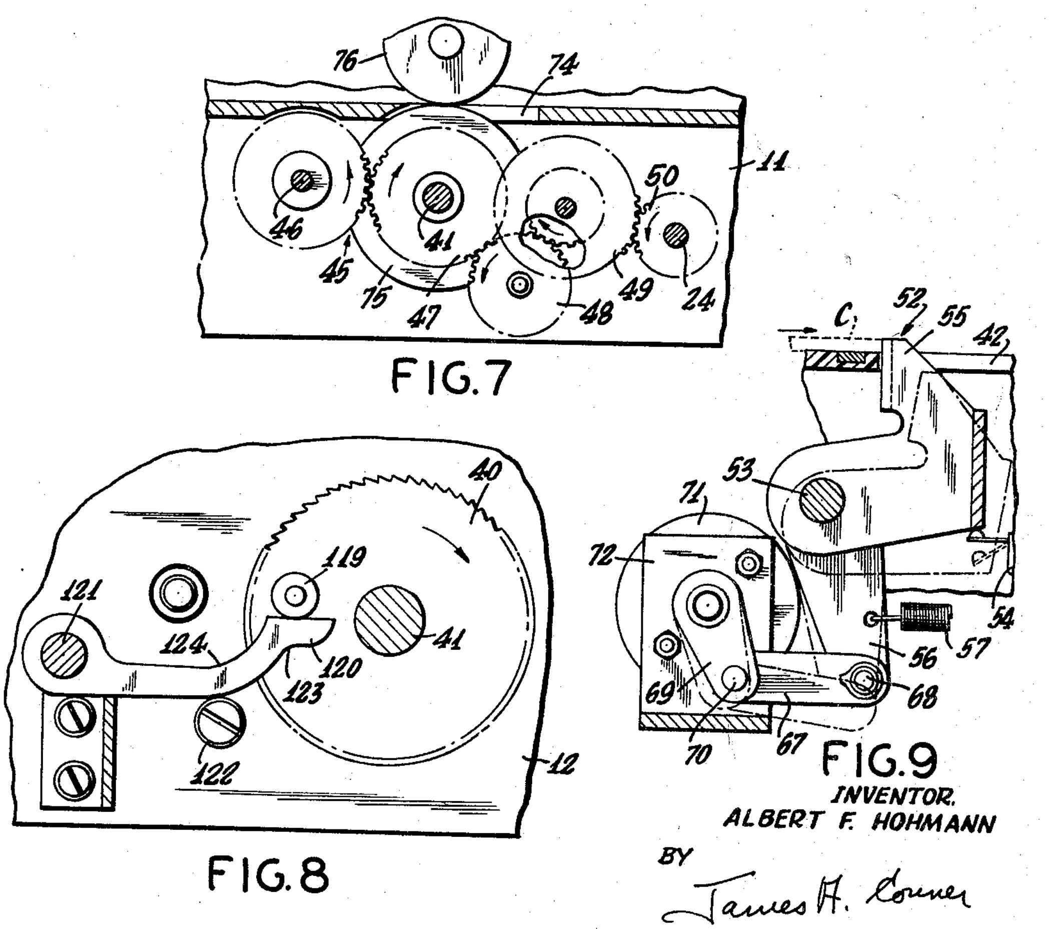
FIGURE 7 is a side view of the gearing for driving the unit seen in the direction of arrows 7—7 of FIG. 5.
FIGURE 8 is a cross-sectional view of a detail, taken on line 8—8 of FIG. 1.
FIGURE 9 is another detail of operation taken on the line 9—9 of FIG. 5.

Assuming it is in contact, however, as shown in FIG. 4, card C having been pushed into the bote of rollers 45 and 51 will be drawn therein and therethrough and passed forward until the card entering edge contacts pivoted stop 52. Connected to stop 52 and in position to be operated by the first small movement thereof around its pivot 53 is a microswitch 54 (FIGS. 4 and 9). The first function of stop 52 is to swivel about its pivot under urge of the entering card C and operate the microswitch, thereby initiating the cycle whereby the solenoid 65 will be energized at the right time to place pawl 34 into operating contact with ratchet wheel 40.

Microswitch 54 is a "card in" switch, indicating to the unit and/or to an operator that a card is in the machine ready to be read. Stop 52 comprises a straight faced abutment 55 mounted on pivot 53 which surrounds shaft 40 and moves freely thereon. Depending arm 56 is provided which is spring-urged by spring 57 into card-stop position. Spring 57 is adjustable as to tension by means of device 58 and the card-stop position can be accurately adjusted by vernier screw 59 abutting against the underside of platen 42 and carried by an arm 66 integral with member 55. Thus, the exact stopping position for the card can be very accurately determined.

Card stop 52 has the two major functions of (1) accurately aligning and registering the punched card C in its pre-selected first position in the unit ready to be read out when the operational cycle therefor begins and (2) operating the "card in" microswitch 54 to initiate said operational cycle. When it has performed these two functions it is obvious that the abutment 55 must be removed away from the card C if the card C is to be travelled forward through the unit for read-out purposes. To this end, arm 56 has a lever 67 attached thereto at its extremity by a pivot pin 68 and lever 67 in turn is attached to bar 69 (FIG. 9) by a pivot 70 whereby the solenoid 71 driving bar 69 can move same when energized to rock abutment 55 out of the path of the card C, namely, to a position below platen 42 and hold it there. The detail of this exact operation is shown in FIG. 9, where in full lines the linkage from solenoid 71 comprising bar 69, level 67 and arm 56 leaves the abutment 55 in card-stop position P facing up card C on platen 42. In dotted lines, the same linkage 69, 67, 56 shows the abutment in a position below the surface of the platen 52 and away from the path of further movement card C across the top surface of platen 42, namely, in the right hand direction shown by the arrow over the card C in FIG. 9. Solenoid 71 is held by a bracket 72 which latter is suitably attached to the frame of the unit with bolts 73 (FIG. 4).

Figure 6:
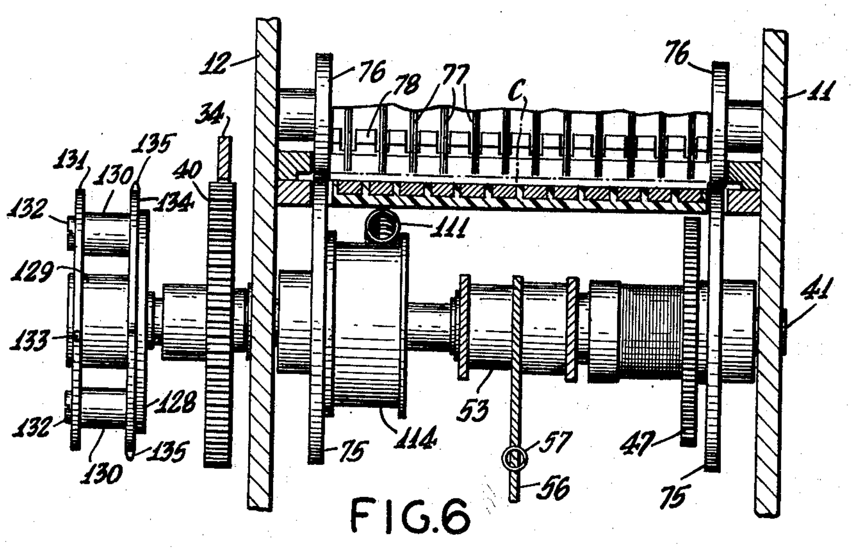
FIGURE 6 is a detail cross-section on the line 6—6 of FIG. 1.

As perhaps best shown in FIG. 7, the platen 42 has a wide slot across its face laterally, as at 74, and operating within this gap are a set of feed rollers and a plurality of pick-up brushes for reading the card in a conventional manner, these devices all being arranged for disengagement from the card C, when desired. To this end, there is provided mounted fixedly on shaft 40 a pair of edge driving rollers 75 which are therefore rotated with the ratchet wheel 40. These rollers 75 contact the peripheral or side edges of the card C in a position out of the way of any punch or slot but capable of exerting pressure, when needed, to accurately impart to the card C the step-by-step increments of movement caused by rotation of the ratchet wheel 40 by pawl 34. In order to give an upper pressure on the card C at this point a pair of complementary pressure rollers 76 are provided (FIGS. 4 and 6). These pressure rollers 76 are adapted to be raised and lowered relative to card C and to the positively driven edge drive rollers 75 so as to cause a frictional grip on card C in lowered position and no grip when raised. Thus, with rollers 76 raised, any card C overlying lower drive rollers 75 will not be acted on as rollers 75 move in increments but if rollers 76 are lowered, the card C will be positively acted on when rollers 75 move in increments. Rollers 76 are not driven but act solely as pressure rollers acting in concert with rollers 75 which are driven by ratchet wheel 40.

In order to provide the desired raising and lowering of rollers 76, association with the brushes to be used for card reading is resorted to, it being borne in mind that such brushes are desirably put into sensing position only when needed for reading the card C and are removed therefrom when the card is not being read or when no card is present on the platen 42. Thus, a plurality of reading brushes 77 are provided extending laterally across the unit as shown in FIG. 1 and mounted conventionally on a cross-bar 78. Each brush terminates in an electrical connector 79 (FIG. 1), from which the signals received at the brushes may be taken to a remote point for recording, as is usual. The brushes 77 and their connections need no detailed explanation, being conventional in form and operation. Where there is a slot or hole in the card being read, the brush makes contact therethrough to establish one signal. Where there is no hole punched, the brush is insulated by the card and no signal occurs. The number of brushes used correspond to the number of columns on the cards being used. This form of reading and interpretation of punched data on a card does not form any part of the present invention and is a mere adaptation of established data processing techniques.

Attached to cross-bar 78 is the pair of edge pressure rollers 76, these being attached on anti-friction bearings 80. In order to move brushes 77 together with rollers 76 into position relative to card C of FIG. 4, cross-bar 78 is adapted to be rocked about its base pivot pin 81 by a solenoid 82 rotating a pin 83 in a slotted arm 84 attached to cross bar 78, a supporting bracket 85 carrying cross bar 78 about pivot pin 81. A spring 86 is attached at 87 to the frame of the unit and at its other end is fixed to one end 88 as lever 89 which is pivoted at 90 and carries at the other end the bearings 80 for pressure rollers 76. When solenoid 82 is energized, this rotates pin 83 in the direction of the arrow on the solenoid 82 and causes both the brushes 77 and the rollers 76 to be swung upwardly away from platen 42 and out of contact with any card therebelow. This condition will pertain while solenoid 82 is energized and will be against the action of spring 86 so that the normal position under urge of spring 86 will be with the pressure rollers 76 in contact with the brushes 77 down in reading position.

Obviously, it is necessary to have very accurate adjustment of the positioning of the brushes 77 relative to the platen 42 both as to pressure and as to orientation and registry with the columns of the cards to be read and therefore, as shown in FIG. 1, the bracket 85 can be closely adjusted relative to the frame of the unit by means of a vernier-adjustment device 91 acting on a flange 92 attached to the rear of bracket 85. By adjustment of the device 91, the relative location of the brushes 77 to the platen 42 can be modified, as needed.

Since the apparatus so far disclosed constitutes means for feeding, and reading a card automatically, a sequential operation therewith will now be explained. A card C is placed on platen 42 and pushed forward until it enters the bite of cooperating rollers 45 and 51 where the card will be frictionally entered between the rollers and passed forward under urge of the lower driving roller 45 running continuously from the prime mover shaft 18. Card C will then strike against abutment 55 and press this back against the action of spring 57 a sufficient distance to operate microswitch 59 as, for instance, to close this and render operative a circuit to initiate the sequential operation of the various control solenoids. Solenoid 82 will be in such position that the brushes 77 and pressure rollers 76 are out of contact to facilitate the entry of card C to stop abutment 55. By a sequential switching means of conventional design, the solenoid 82 will now be operated to lower the brushes 77 onto the front or entering edge of card C and to make pressure contact of pressure rollers 76 with the edges of the card, holding these frictionally against lower drive rollers 75, which are at rest. In the next step of the controlling switching system, solenoid 65 will be de-nergized to lower the pawl 34 onto ratchet wheel 40. Since indexing cam has been constantially running by means of its drive from prime mover shaft 18, with cam follower 28 idling, removal of roller 62 from the arm 32 will immediately result in pawl 34 stepping ratchet wheel 40 tooth by tooth, in increments of rotational movement of shaft 41 determined by the tooth spacing. This movement will be transmitted to cooperating rollers 75 and 76, with the result that the card C will be longitudinally displaced in increments corresponding to the tooth spacing of ratchet wheel 40. Since such spacing has been predetermined for the spacing between columns of the data on the card, the card C will now be progressed below the brushes 77, column by column, and the read out information will be passed from connectors 79 to the remote source of storing or otherwise using the read out data. The card C will be passed by the brushes 77 until all columns have been read. By selecting the number of teeth for ratchet wheel 40 equivalent to the exact number of columns of the card, such as 80 columns, and by then arranging a gap 93 (shown in FIGS. 2 and 8) between the start and stop point, the card C will be read through its columns and thereafter, the pawl 34 will idle in gap 93. Thus, it would be now possible to reverse all operations, whereby brushes 77 and rollers 76 could be removed from the card, and pawl 34 could be raised up by moving roller 62 to position 62*a*, to disconnect the pawl 34 from ratchet wheel 40. Then the card C could be manually removed.

However, according to the present invention, it is desired to provide means for positively returning ratchet wheel 40 to a zero position after reading any card and particularly it is desired to provide means for automatically returning card C back on the platen 42 to its original starting position, for removal by hand using thumbslot 43.

These ends are obtained by utilizing index control means for ratchet wheel 40 and by utilizing a spring rewind device for returning the card.

Provided on a pivot pin 94 is a return pawl 95 having a spring 96 connected at one end at 97, the other end of the spring being held firm to the frame by a pin 98. Thus, return pawl 95 is normally urged by spring 96 into engaging contact with ratchet wheel 40 and pawl 95 having reverse teeth to prevent backward movement opposite to the arrow in FIG. 2 of the ratchet wheel 40. Thus, ratchet wheel 40 can move step by step in the one direction only when pawl 34 is in contact therewith. Intermediate return pawl 95 is pivoted an operating rod 99 which is connected at its upper end to the arm 100 of a solenoid 101. The linkage 100 and 99 is such that upon energizing solenoid 101, pawl 95 is lifted up, against spring 96 and around its pivot 94, to remove the teeth of the pawl 95 from the teeth of ratchet wheel 40, so that this ratchet wheel could now reverse its motion, if so urged. Intermediate rod 99, there is pivoted a lever 102 which has its other end fast on a shaft 103 mounted for limited rotational movement across the unit as shown in FIG. 1. Fast upon shaft 103 is a bracket 104 spring biased by a spring 105 against its limited rotation and bracket 104 has an arm 106 on which is mounted roller 51 in a suitable anti-frictional bearing 107. Thus, when solenoid 101 is energized, it causes roller 51 to be moved away from the platen 42 to a non-operating position simultaneously with the removal of return pawl 95 from contact with ratchet wheel 40. It will be noted that the nose or point 35 of pawl 34 overlies the end of pawl 95 so that when pawl 95 is raised, it will positively raise pawl 34 at the same time should this still be down. This is a safety precaution to prevent return of ratchet wheel 40 while pawl 34 is still in fouling position.

In order to create the necessary power to cause the driving back of card C when return pawl 95 and roller 51 are removed from their respective operative positions by solenoid 101, means are provided to store up energy in a spring during step-by-step movements of ratchet wheel 40 in its forward driven direction, so that such energy can be used for return movements of card C. To this end, as best shown in FIGS. 4, 5 and 6, there is attached to shaft 46 the loop 110 of a long coiled tension spring 111, which spring passes around a guide pulley 112 mounted for free movement on a shaft 113 which extends between side plates 11 and 12 of the frame and is suitably affixed thereto, also acting as a main brace for the frame unit.

Spring 111 extends on its other reach beyond pulley 112 to a wide receiving pulley 114 which is fixedly mounted on shaft 41 in close proximity with one edge pressure roller 75 (FIG. 6) and is adapted to move therewith. Spring 111 is affixed at this end on pulley 114 by a pin 115 so that, as pulley 114 rotates, the spring 111 will be wound up on pulley 114 being extended over guide pulley 112, pulley 114 being wide enough, as clearly shown to accommodate the spring 111 to a complete 360° revolution of the pulley 114. Since shaft 41 is rotated in increments by the ratchet-pawl drive 34, i.e., is stepped toward the observer in FIG. 5, then the spring 111 will be equally stepped around the pulley 114 and will be progressively extended against its resiliency during this progressive movement, storing up spring-return energy thereby. Normally, this energy will not be available to return the ratchet wheel 40 back through its path because of return pawl 95, but when this is taken out of contact with the ratchet wheel 40, the shaft 41 with all its attached members will rotate in reverse under such spring-urge. This will therefore turn the edge drive rollers in reverse to send the card back. However, if the operation were not controlled, the sudden release of stored energy in the spring 111 would send the card back at a terrific speed both damaging the card and dangerous to an operator of the machine, so that there is provided a controlled braking action on the return mechanism. This comprises a large diameter pulley 116 fixedly mounted on shaft 46 and a small driving pinion 117 mounted to move with main with main drive shaft 24 (FIG. 3), these being connected together by a positive drive belt 118, and this drive is mounted on the other side of the unit to the main drive, as in FIG. 1. Thus, at all times, whatever the direction of movement of the card C, the shaft 46 is positively driven from the main drive shaft 24, and thus, roller 45 which is the lower forward driving roller has always applied thereto a powerful fast speed rotation by virtue of the relationship of diameters of pulley 116 and pinion 117. Therefore, as the card C is urged back under spring action by rollers, there will be a strong braking action on the lower face of card C by the positive drive of roller 45 through belt 118, pinion 117 and pulley 116 so that there will be a drag on the return movement of the card which, by arrangement of the parts, can be calculated to give any desired rate of return which will be proper. To sum up therefore, on return under spring urge of the wound-up spring 111, the card will be returned by edge driving rollers 75 against the action of a brake formed by belt drive 116, 117, 118.

It will be obvious that the various parts for control will be calculated to work in cooperation and synchronism. The ratchet wheel 40 will have thereon the necessary number of teeth for the type of card being processed and different teeth arrangements can be made by replacing this ratchet wheel 40 whereby the unit may be converted to different card arrangements. The cam 27 which is the main indexing device may also readily be replaced for different spacing. It is desirable in a unit of this type, however, to allow for reading of lesser columns than the total available, since in the interests of quick data processing only a portion of the card need be read. Also, and as a necessary feature with such short reading, positive stops to indicate end of reading and positive return to a zero position for the next card reading are essential.

To accomplish these ends, first there is provided mounted directly on the body of ratchet wheel 40, a stop 119, which projects outwardly into the path of a lever 120 pivoted at 121 and resting at zero position against a positive rest 122 (FIG. 8) whereby, when the ratchet wheel 40 is rotated backwards on return-card pass by spring 111, the mechanism can only go to the position in FIG. 8 and this will be the correct starting position or zero position for commencement of the cyclic operation of reading a card. When the wheel 40 is rotated step by step in its opposite direction, namely the forward direction of the arrow on FIG. 8, stop 119 will move with the wheel 40 until it passes below lever 120 and can contact the shaped cam face thereof 123 when further movement will swing lever 120 about pivot 121 and be swung upwardly until the upper curved surface of lever 120 at 124 is pushed into contact with a roller 125 attached to an arm 126 (FIG. 1) pivoted around shaft 103. The function of roller 125 is clear from FIGS. 2 and 8 whereby when roller 125 is moved up by arm 124 and initiated by stop 119, it contacts the depending end 127 of pawl 95 and presses this upwardly to swing pawl 95 about its pivot 94 in a clockwise direction from the dotted line position in FIG. 2 to the full line position when the pawl is in operative position in connection with the teeth on ratchet wheel 40. Thus, stop 119, rotating with ratchet wheel 40, causes the pawl 95 to be positively engaged with the ratchet wheel 40 at the end of the incremental movement forward of ratchet wheel under urge of pawl 34 and cam 27 and also serves to zero the device when the card has been returned.

In order to positively signal the event of zero position being achieved and to integrate this information with the remote control circuit, a suitable microswitch can be used to indicate the end of the cycle and the readiness for another sequential card reading. Also, in order to make possible the disconnecting of the brushes from reading position when only a portion of the card is to be read, suitable microswitch control of that function is desirable. It should be realized that at all times the card will complete its cylic movement, namely, will go all through the length of the platen for full reading of all columns and then be returned but since the time taken can be as low as two or three seconds, there is no reason to provide means to return the card sooner when it is being only partially read and the only need is to disconnect the brushes from operative reading action whenever no further reading is required.

As best shown in FIG. 6, there is provided a circular mounting platen 128 fast upon an external projection of shaft 41 and moving therewith and carrying a center hub 129 and a pair of projecting posts 130. Mounted upon plate 128 in any desired position relative thereto is a first cam plate 131 being washer shaped to fit over hub 129 and bored to receive screws 132 which fasten cam plate 131 to the posts 129. A single rounded tooth or upstanding abutment 133 appears on the otherwise circular surface of cam plate 131. Also mounted on plate 128 is another washer-shaped cam plate 134, this being similarly mounted as cam plate 131 and being spaced apart therefrom by posts 129. The number of rounded teeth or upstanding abutments of cam plate 134 vary in accordance with the desired activation of the brushes for reading out the card since the object of the abutments or teeth or cam plate 134 is to actuate or deactuate the brushes or like card read-out means as needed. In the illustrated form, two rounded teeth 135 (FIGS. 2 and 6) are shown.

Situated in the normal path of rotation of cam plates 131 and 134 are two microswitches 136 and 137 fastened upon the main frame by a bracket 138. The actuators 139 and 140 of these switches 136 and 137 will normally roll smoothly on the circular peripheral edges of their respective cam plates 131 and 134, but when the abutments 133 and 135 respectively are present, the switches are then actuated to different operating conditions. Thus, cam plate 131 will be so registered that it will de-actuate microswitch 139 when the device is in zero position (FIG. 8) with stop 119 against arm 124. This can be utilized to operate solenoid 101 to cause return of the card in the manner heretofore described.

In like operational manner, cam plate 134 can operate switch 139 by normally having the switch in closed or "on" position to keep the solenoid 82 in position for operation of the brushes 77 and, whenever an abutment 135 causes de-energizing of the solenoid 82, the brushes will be disconnected from reading position, so that any or all of the columns on card C can be read by correct selection of the contour of cam plate 134.

As has been generally indicated, the unit of the present invention may be readily adapted for operation with remote controlled units and in order to synchronize this unit with such external apparatus, main shaft 18, which extends across the frame as previously described, has mounted thereon, to move therewith, a plurality of timing cams 142, each operating a cam follower 143 which in turn operate microswitches 143, 144 and 145. The specific microswitches can control the external circuits needed and any number of timing cams 141, followers, 142 and microswitches such as 143 can be provided. As an example of an external use of such microswitches as have been provided, switch 143 may control a tape punch to be used with this device and which can be receive the data read by brushes 77 from card C; switch 144 may control the programming device, namely, the sequential switching device for operation of the unit; and switch 145 may control an alphameric shifting device for the tape punch. The type of apparatus used for external cooperation with the integral sequential card reader device of the present invention may vary and can be selected as needed once provision has been made for correctly synchronizing the device with such external apparatus.

Having specifically described the exact manner of operation, the actual sequence of operations which are followed when using the device of the present invention will now be traced.

Assuming the device is at rest, means are provided to start the prime mover of any type such as an electrical motor (not shown) for direct drive to pulley 19 from belt 20. Once this has been started the machine will idle and there is no need to disconnect this power while the machine is available for operation. It can be left running for intermittent use without harm. When main shaft 24 running and the machine at rest, indexing cam 27 will rotate and cam follower 28 will run idle as long as is desired. Solenoid 65 will be de-energized so that pawl 34 will be out of contact with ratchet wheel 40 and held out of operating position by roller 62. Arm 120 and stop 119 will be in "zero" position (FIG. 8). The brushes 77 and rollers 76 will be in "out-of-operation" position with solenoid 82 de-energized. Return pawl 95 will be in contact with ratchet wheel 40 and roller 51 will be in lowered operating position with the solenoid 101 operating these de-energized.

Driving roller 45 is constantly rotating in a clockwise direction in contact with roller 51. If now a card C is entered into the unit and is passed manually to and into the bite of rotating rollers 45 and 51, the following sequence of events take place.

The card C is passed forward on platen 42 by rollers 45 and 51 until the entering or forward edge comes in contact with stop 55 which is moved thereby sufficient to cause microswitch 54 to be closed to indicate "card in." This is passed to a remote controller where a suitable sequential switching will now take place. The first switching movement is to close a switch to energize solenoid 71 which moves the linkage (FIG. 9) to remove stop 55 from the path of the card to a position below the platen 42 and hold the stop down until the solenoid 71 is automatically de-energized at the end of the operating cycle.

Next sequential switching is that needed to energize solenoid 82 to cause the brushes 77 to be lowered into contact position with the card C and rollers 76 into edge contact with the card C also. The next sequence is to energize solenoid 65 to lower roller 62 from holding contact position with arm 32 of pawl 34 so that pawl 34 now is in operative position with respect to ratchet wheel 40. The device will now give incremental movements to the card column by column under urge of pawl 34 and ratchet wheel 40. If the microswitch 140 is opened at any time during this movement, the energizing current from the brushes 77 is disconnected and the column is left blank. If the cam plate 134 is completely circular except for one abutment, this will act to disconnect power to solenoid 82 to raise the brushes 77 now that all columns have been read.

At the end of the reading of the card when all columns have been scanned, microswitch 136 will now be closed by tooth 133 on cam plate 131 to energize solenoid 101 and raise return pawl 95 out of position with respect to ratchet wheel 40, and simultaneously, solenoid 65 will be de-energized to allow roller 62 to raise pawl 34 out of position. Since during the forward progression spring 111 has been wound up, it can now release its energy and return the card back to starting position under braking action of belt 118 and pulleys 116 and 117, since edge drive rollers 76 have been raised with brushes 77. The return action will cause stop 119 to engage arm 124 to "zero" the parts. In that position, microswitch 136 is opened to de-energize solenoid 101 and permit return pawl 95 to resume its position in contact with ratchet wheel 40. The card no longer being in position, card-in switch 54 will now be open and solenoid 71 will be de-energized to allow stop 55 to return to starting position. Thus, the whole operational cycle can commence again.

As an example, about 3 to 4 seconds only are needed for one complete cycle of feeding, reading and return.

Since the operational switching is conventional, it is not believed that such needs amplification. A simple 4-position step switch operating from position 1 to position 4 in a predetermined time cycle can switch in the solenoids in the order of 71; 134; 65; 101; which governs the operation, and microswitch 134 must be open and in series with step No. 2 to cause operation while the microswitch 136 must be in series and closed in step No. 4 to operate. "Card-in" microswitch 51 causes operation of the step-switch and when steps 1 to 4 have been run through a position 5 everything is at zero and ready for the next cycle of operation.

Obvious substitutions and modifications can be made in accordance with the present invention without departing from the spirit and scope of the attached claims. For example, the external control circuits can be of any type which will perform the sequential functions needed for this apparatus and any form of prime mover can be used to drive the unit. Furthermore, while the unit has been described as particularly for use with other units for recording or storing the data retrieved from the brushes or like sensing fingers, it is obvious that direct read out could be built within the unit itself.

Essentially, the sequential card reader according to the present invention comprises a unit adapted to be operated with any time of punched card to read out the data therefrom which is simple, and economical and which does not require skilled operators to handle. It provides a foolproof simple device for use, particularly when the information being fed is intermittently supplied. While the unit of the present invention has been described as having a constant speed unidirectional main drive from either a prime mover source or an integral drive such as an electrical motor fast on the frame and driving main shaft 18, it is obvious that this could be a reversible drive of either type of prime mover. In case, in order to obtain return of the card, the main shaft 18 could be reversed at the end of the forward feeding part of the cycle and the card would be returned, thus rendering the spring return 111 and control therefor 116, 117, 118 unnecessary.

Other modifications and arrangements of parts are obvious within the spirit and scope of the present invention and the accompanying claims.

What is claimed is:

1. In a sequential punched card reading unit, in combination, a supporting platen for receiving the punched card thereon and having means for guiding the card for longitudinal movement thereon, card-actuated means for aligning a card longitudinally on the platen in initial card-reading position, means for feeding a card forwardly along the platen to said initial position, means controlled by said actuation of said aligning means by said card to retract said aligning means out of the path of the card, incremental drive means for progressively moving the card step by step along the platen in predetermined steps of movement in forward direction from said initial position, and means controlled by actuation of said aligning means by said card to actuate said drive means.

2. The combination of claim 1, means to render the card-feeding means inoperative, and means for reversing the incremental drive means and causing it to move the card backwards in continuous movement.

3. The combination of claim 2, in combination with a prime mover and means connected to the prime mover for actuating the card-feeding means continuously, and the incremental drive means step by step, and means to terminate the forward incremental operation of said incremental drive means.

4. In the combination of claim 3, said card-feeding means comprising upper and lower friction rolls adapted to contact opposite sides of the card on the platen, said means for continuously actuating the card-feeding means comprisiing means for continuously rotating the lower of said rolls, and means for lifting the upper roll off said card, releasable means for preventing rotation of the incremental drive means in a direction for retracting the card, and means controlled by the means for lifting the upper roll for rendering said preventing means inoperative.

5. The combination of claim 3, said aligning means comprising a spring-urged abutment against which the forward edge of the card may abut, and electrically operated means controlled by movement of said abutment when the card strikes said abutment, to retract said abutment and hold said abutment in retracted position out of the path of the card.

6. The combination of claim 1, said incremental drive means comprising a ratchet wheel, a prime mover, a cam, means for connecting said prime mover to said cam for rotating the latter, pawl means controlled by said cam for step by step engagement with said ratchet wheel to rotate said ratchet wheel step by step in one direction, and means controlled by said aligning means to move said pawl into and out of ratchet-operating positions.

7. In a sequential punched card reading unit, the combination of a prime mover drive with a supporting platen for receiving a punched card thereon, card-feeding means including a pair of friction rolls for contacting the card on the platen therebetween, means for continuously driving the lower of said rolls from said prime mover, means for removing the upper roll to remove the friction control of the card, a card-aligning means normally in the path of movement of said card on said platen comprising a spring-urged abutment against which said card can register, a first contact switch closed by said card striking said abutment to close said switch and initiate a "card-in" circuit, means operated by a solenoid to swing said abutment of the path of movement of said card and to hold same there, said solenoid being operated at one switch of a time sequence switching device rendered initially operable by closing said "card-in" switch, a cam constantly rotating on one direction from said prime mover, a cam follower constantly following said cam, said cam being shaped with a single incline to give a reciprocating vertical rise and fall motion to said cam follower, a pivoted driving pawl normally in contact with said cam follower and sharing its movement, said driving pawl being spring-urged into contact with said cam follower, means including a solenoid acting against said spring when energized to raise said driving pawl out of contact with said cam follower to an inactive, non-reciprocating position, a multi-tooth ratchet wheel mounted fixedly on a shaft and arranged below said driving pawl to be engaged thereby and given a step by step rotational movement under urge thereof in active position but being disconnected therefrom in inactive position.

8. The combination of claim 7, a pivoted return pawl normally spring-urged into engagement with said ratchet wheel in opposition to said driving pawl to prevent reverse motion of said ratchet wheel, a solenoid connected to said return pawl to disconnect said pawl from said ratchet wheel, when energized, a return spring wound around said shaft and tensioned by said step by step movement of said ratchet wheel under urge of said driving cam, a pair of drive rollers on said shaft adapted to move with said shaft and ratchet wheel and contact the underside of said card at its lateral edges, a pair of cooperating driven rollers above said driving rollers adapted to press upon the lateral edges of said card to cause friction drive of said card at said lateral edges in one direction, sequential electrical operating means for causing said card to be first entered and received, then aligned, then stepped, then freed of said driven rollers, and by reversing the rotation of said edge driving rollers under urge of said spring, thereafter returned to initial entering position.

9. In a sequential punched card reading unit, the combination of a prime mover drive with a supporting platen for receiving a punched card thereon; card-feeding means including a pair of friction rolls for contacting the card therebetween, continuously driven from said prime mover, means for removing the frictional contact on the card; a card-aligning means normally in the path of movement of said card on said platen comprising a spring-urged abutment against which said card can register; means operated to swing said abutment out of the path of movement of said card and to hold same there, a cam constantly rotating in one direction from said prime mover, a cam follower constantly following said cam, said cam being shaped with a single incline to give a reciprocating vertical rise and fall motion to said cam follower; a pivoted driving pawl normally in contact with said cam follower and sharing its movements; said driving pawl being spring-urged into contact with said cam follower; means including a solenoid acting against said spring, when energized, to raise said driving pawl out of contact with said cam follower, to an inactive, non-reciprocating position; a multi-toothed ratchet wheel mounted fixedly on a shaft and arranged below said driving pawl to be engaged thereby and given a step by step rotational movement under urge thereof in active position, but being disconnected therefrom in inactive position; a pivoted return pawl normally spring-urged into engagement with said ratch wheel in opposition to said driving pawl to prevent reverse motion of said ratchet wheel, a solenoid connected to said return pawl to disconnect same from said ratchet wheel when energized, a return spring wound around said shaft and tensioned by said step by step movements of said ratchet wheel under urge of said driving cam; a pair of driving rollers on said shaft adapted to move with said shaft and ratchet wheel and contact the underside of said card at its lateral edges; a pair of cooperating driven rollers above said driving rollers adapted to press upon the lateral edges of said card to cause a friction drive of said card at said lateral edges in one direction; sequential electrical operating means for causing said card to be first entered and received, then aligned, then stepped, then freed of said driven rollers, and, by reversing rotation of said edge driving rollers under urge of said spring, thereafter returned to initial entering position.

10. In a sequential punched card reading unit, the combination of a prime mover drive with a supporting platen for supporting and receiving a punched card to be read; card-feeding means including a pair of friction rolls for contacting the card therebetween, continuously driven from said prime mover, means for removing the frictional contact on the card; a card-aligning means normally in the path of movement of said card on said platen comprising a spring-urged abutment against which said card can register; means operated to swing said abutment out of the path of movement of said card and to hold same there, a cam constantly rotating in one direction from said prime mover; a cam follower constantly following said cam, a pivoted driving pawl normally in contact with said cam follower and sharing its movements; said driving pawl being in contact with said cam follower; means to raise said driving pawl out of contact with said cam follower, to an inactive, non-reciprocating position; a multi-toothed ratchet wheel mounted fixedly on a shaft and arranged below said driving pawl to be engaged thereby and given a step by step rotational movement under urge thereof in active position, but being disconnected therefrom in inactive position; a pivoted return pawl normally spring-urged into engagement with said ratchet wheel in opposition to said driving pawl to prevent reverse motion of said ratchet wheel, a return spring wound around said shaft and tensioned by said step by step movements of said ratchet wheel under urge of said driving cam; a pair of driving rollers on said shaft adapted to move with said shaft and ratchet wheel and contact the underside of said card at its lateral edges; a pair of cooperating driven rollers above said driving rollers adapted to press upon the lateral edges of said card at said lateral edges in one direction; and, by reversing rotation of said edge driving rollers under urge of said spring, thereafter returned to initial entering position.

11. In a sequential punched card reading unit, the combination of a prime mover drive with a supporting platen for receiving and supporting a card to be read; card-feeding means including a pair of friction rolls for contacting the card therebetween, the lower of said rolls being continuously driven from said prime mover, means for removing the upper roll to remove the frictional contact on the card; a card-aligning means normally in the path of movement of said card on said platen comprising a spring-urged abutment against which said card can register; a first contact switch closed by said card striking said abutment to close said switch and initiate a "card-in" circuit; means operated by a solenoid to swing said abutment out of the path of movement of said card and to hold same there, said solenoid being operated at one switch of a time sequence switching device rendered initially operable by closing said "card-in" switch; a cam constantly rotating in one direction from said prime mover; a cam follower constantly following said cam, a pivoted driving pawl normally in contact with said cam follower and sharing its movements, said driving pawl being in contact with said cam follower; means to raise said driving pawl out of contact with said cam follower, to an inactive, non-reciprocating position; a multi-toothed ratchet wheel mounted fixedly on a shaft and arranged below said driving pawl to be engaged thereby and given a step by step rotational movement under urge thereof in active position, but being disconnected therefrom in inactive position; a pivoted return pawl normally spring-urged into engagement with said ratchet wheel in opposition to said driving pawl to prevent reverse motion of said ratchet wheel, a return spring wound around said shaft and tensioned by said step by step movements of said ratchet wheel under urge of said driving cam; a pair of driving rollers on said shaft adapted to move with said shaft and ratchet wheel and contact the underside of said card at its lateral edges; a pair of cooperating driven rollers above said driving rollers adapted to press upon the lateral edges of said card to cause a friction drive of said card at lateral edges in one direction; sequential electrical operating means for causing said card to be first entered and received, then aligned, then stepped, then freed of said driven rollers and, by reversing rotation of said edge driving rollers under urge of said spring, thereafter returned to initial entering position.

12. In a sequential punched card reading unit, the combination of a prime mover drive with a supporting platen for supporting and receiving a card to be read; card-feeding means including a pair of friction rolls for contacting the card therebetween, the lower of said rolls being continuously driven from said prime mover, means for removing the upper roll to remove the frictional contact on the card; a card-aligning means normally in the path of movement of said card on said platen comprising a spring-urged abutment against which said card can register; a first contact switch closed by said card striking said abutment to close said switch and initiate a "card-in" circuit; means operated by a solenoid to swing said abutment out of the path of movement of said card and to hold same there, said solenoid being operated at one switch of a time sequence switching device rendered initially operable by closing said "card-in" switch; a cam constantly rotating in one direction from said prime mover; a cam follower constantly following said cam, said cam being shaped with a single incline to give a reciprocating vertical rise and fall motion to said cam follower; a pivoted driving pawl normally in contact with said cam follower and sharing its movements, said driving pawl being spring-urged into contact with said cam follower; means including a solenoid acting against said spring, when energized, to raise said driving pawl out of contact with said cam follower, to an inactive, non-reciprocating position; a multi-toothed ratchet wheel mounted fixedly on a shaft and arranged below said driving pawl to be engaged thereby and given a step by step rotational movement under urge thereof in active position, but being disconnected therefrom in inactive position; a pivoted return pawl normally spring-urged into engagement with said ratchet wheel in opposition to said driving pawl to prevent reverse motion of said ratchet wheel, a solenoid connected to said return pawl to disconnect the same from said ratchet wheel when energized, a return spring wound around said ratchet wheel under urge of said driving cam; a pair of driving rollers on said shaft adapted to move with said shaft and ratchet wheel and contact the underside of said card at its lateral edges; a pair of cooperating driven rollers above said driving rollers adapted to press upon the lateral edges of said card to cause a friction drive of said card at said lateral edges in one direction and, by reversing rotation of said edge driving rollers under urge of said spring, thereafter returned to initial entering position.

13. In a sequential punched card reading unit, the combination of a prime mover drive with a supporting platen for receiving a card; card-feeding means including a pair of friction rolls for contacting the card therebetween, the lower of said rolls being continuously driven from said prime mover, means for removing the upper roll to remove the frictional contact on the card; a card-aligning means normally in the path of movement of said card on said platen comprising a spring-urged abutment against which said card can register; a first contact switch closed by said card striking said abutment to close said switch and initiate a "card-in" circuit; means operated by a solenoid to swing said abutment out of the path of movement of said card and to hold same there, said solenoid being operated at one switch of a time sequence switching device rendered initially operable by closing said "card-in" switch; a cam constantly rotating in one direction from said prime mover; a cam follower constantly following said cam, a pivoted driving pawl normally in contact with said cam follower and sharing its movements, said driving pawl being spring-urged into contact with said cam follower; means to raise said driving pawl out of contact with said cam follower, to an inactive, non-reciprocating position; a multi-toothed ratchet wheel mounted fixedly on a shaft and arranged below said driving pawl to be engaged thereby and given a step by step rotational movement under urge thereof in active position, but being disconnected therefrom in inactive position; a pivoted return pawl normally spring-urged into engagement with said ratchet wheel in opposition to said driving pawl to prevent reverse motion of said ratchet wheel, a return spring wound around said shaft and tensioned by said step by step movements of said ratchet wheel under urge of said driving cam, a pair of driving rollers on said shaft adapted to move with said shaft and ratchet wheel and contact the underside of said card at its lateral edges; a pair of cooperating driven rollers above said driving rollers adapted to press upon the lateral edges in one direction and, by reversing rotation of said edge driving rollers under urge of said spring, thereafter returned to initial entering position.

14. Card processing apparatus for sequential reading of data comprising a card-receiving platen; constantly operating card-receiving and moving means; including a driven and a driving roll for laterally moving a punched card onto and along said platen, an aligning member normally in the path of movement of said card comprising a spring-urged stop; for locating and arresting said card at a predetermined position on said platen; a plurality of driving and driven rollers frictionally engaging the edge of said card forward driving thereof along said platen, means for separating said rollers to remove said frictional engagement, a stepped driving ratchet operatively attached to said rollers and a pawl engaging said ratchet to give incremental forward movements to said card on said platen, a cam-operated drive for said pawl, a constantly operating prime mover driving said cam to move said card forward step by step, means for removing said pawl from said ratchet automatically when said card has been scanned to the desired amount, means to remove all forward frictional driving movements from said card and to simultaneously remove said aligning member from contact with said card, and means for applying a return frictional force on said card in reverse direction along said platen, which force has been generated by said step by step forward movements of the card and has been stored for return of said card.

15. Card processing apparatus for sequential reading of data comprising a card-receiving platen; constantly operating card-receiving platen; constantly operating card receiving and moving means; including a driven and a driving roll for laterally moving a punched card onto and along said platen, an aligning member normally in the path of movement of said card comprising a spring-urged stop; for locating and arresting said card at a predetermined position on said platen, a microswitch operated by a small first movement of said stop to be closed to indicate a "card-in" impulse to a remote point, said first movement being under urge of said entering card and positioning the card at a "card-in" location for subsequent data reading, a plurality of driving and driven rollers frictionally engaging the edge of said card for forward driving thereof along said platen, means for separating said rollers to remove said frictional engagement, a stepped driving ratchet operatively attached to said rollers and a pawl engaging said ratchet to give incremental forward movements to said card on said platen, a cam operated drive for said pawl, a constantly operating prime mover driving said cam to move said card forward step by step, means for removing said pawl from said ratchet automatically when said card has been scanned to the desired amount, means to remove all forward frictional driving movements from said card and to simultaneously remove said aligning member from contact with said card and means for applying a return frictional force on said card in reverse direction along said platen which force has been generated by said step by step forward movements of the card and has been stored for return of said card, and a remote control stepping switch actuated initially by said "card-in" impulse and thereafter acting at timed intervals to remove said stop, said frictional edge driving rollers and said driving rolls from their operative contact with said card and finally to initiate the release means for said return frictional force, whereby said card is sent back to its initial position of receipt by said card moving means.

16. Card processing apparatus for sequential reading of data comprising a card receiving platen; constantly operating card-receiving and moving means; for laterally moving a punched card onto and along said platen, an aligning member normally in the path of movement of said card for locating and arresting said card at a predetermined position on said platen, a plurality of driving and driven rollers frictionally engaging the edge of said card for forward driving thereof along said platen, means for separating said rollers to remove said frictional engagement, a stepped driving ratchet operatively attached to said rollers and a pawl engaging said ratchet to give incremental forward movements to said card on said platen, a cam operated drive for said pawl, a constantly operating prime mover driving said cam to move said card forward step by step, means for removing said pawl from said ratchet, means to remove all forward frictional driving movements from said card and to simultaneously remove said aligning member from contact with said card and means for applying a return frictional force on said card in reverse direction along said platen.

17. Card processing apparatus for sequential reading of data comprising a card receiving platen; constantly operating card receiving and moving means; including a driven and a driving roll for laterally moving a punched card onto and along said platen, an aligning member normally in the path of movement of said card comprising a spring-urged stop; for locating and arresting said card at a predetermined position on said platen, a plurality of driving and driven rollers frictionally engaging the edge of said card for forward driving thereof along said platen, means for separating said rollers to remove said frictional engagement, a stepped driving ratchet operatively attached to said rollers and a pawl engaging said ratchet to give incremental forward movements to said card on said platen, a cam-operated drive for said pawl, a constantly operating prime mover driving said cam to move said card forward step by step, means for removing said pawl from said ratchet, means to remove all forward frictional driving movements from said card and to simultaneously remove said aligning member from contact with said card and means for supplying a return frictional force on said card in reverse direction along said platen which force has been generated by said step by step forward movements of the card and has been stored for return of said card, a microswitch operated by a small first movement of said stop to be closed to indicate a "card-in" impulse to a remote point, said first movement being under urge of said entering card and positioning the card at a "card-in" location for subsequent data reading, and a remote control stepping switch actuated initially by said "card-in" impulse and thereafter acting at timed intervals to remove said stop, said frictional edge driving rollers and said driving rolls from their operative contact with said card and finally to initiate the release means for said return frictional force, whereby said card is sent back to its initial position of receipt by said card moving means.

18. A sequential card reading unit for data processing comprising the combination of a prime mover with a platen for receiving a punched card, a main shaft driven at constant speed and in one direction from said prime mover, frictional means driven from said main shaft for receiving and driving the card initially forward along said platen, an alignment member for stopping such movement, means for removing said alignment member out of the path of the card after the card is stopped, a plurality of cooperating pairs of card edge driving rollers movable into and out of frictional driving contact with the lateral edges of said card, a stepped element drivingly attached to said driving rollers, an operating element driving said stepped element to advance said card in increments in one direction, and driven from said main shaft, means for disconnecting said operating element from said stepped element to permit movement of the card in the opposite direction and automatic means for cyclically operating the device to receive the card, progressively pass it over the platen in incremental movements spaced to the data present on the punched card, remove the alignment member, and apply a reverse rotation to said card edge driving rollers, to return the card to initial receiving position.

References Cited by the Examiner

UNITED STATES PATENTS

| | | | |
|---|---|---|---|
| 458,945 | 9/91 | Crane et al. | 271—52 |
| 2,831,634 | 4/58 | Luhn | 235—61.11 |
| 2,853,237 | 9/58 | Zaffarano et al. | 235—61.11 |
| 2,880,999 | 4/59 | Oldenboom | 271—52 |
| 2,916,129 | 12/59 | Parker | 197—128 |
| 2,970,751 | 2/61 | Daly et al. | 271—60 X |

FOREIGN PATENTS

| | | |
|---|---|---|
| 831,112 | 3/60 | Great Britain. |

ROBERT B. REEVES, *Acting Primary Examiner.*

CORNELIUS D. ANGEL, MALCOLM A. MORRISON, ROBERT B. REEVES, *Examiners.*